United States Patent
Bajaj et al.

(10) Patent No.: US 9,457,520 B2
(45) Date of Patent: Oct. 4, 2016

(54) APPARATUS FOR PRINTING A CHEMICAL MECHANICAL POLISHING PAD

(71) Applicant: Applied Materials, Inc., Santa Clara, CA (US)

(72) Inventors: Rajeev Bajaj, Fremont, CA (US); Barry Lee Chin, Saratoga, CA (US); Terrance Y. Lee, Oakland, CA (US)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 14/737,356

(22) Filed: Jun. 11, 2015

(65) Prior Publication Data

US 2015/0273770 A1    Oct. 1, 2015

Related U.S. Application Data

(63) Continuation of application No. 13/591,051, filed on Aug. 21, 2012, now Pat. No. 9,067,299.

(60) Provisional application No. 61/638,461, filed on Apr. 25, 2012.

(51) Int. Cl.
*B29C 67/00* (2006.01)
*B24B 37/26* (2012.01)
*B24D 18/00* (2006.01)
*B33Y 80/00* (2015.01)
*B33Y 30/00* (2015.01)
*B33Y 50/02* (2015.01)
*B29K 75/00* (2006.01)
*B29K 509/02* (2006.01)

(52) U.S. Cl.
CPC .......... *B29C 67/0088* (2013.01); *B24B 37/26* (2013.01); *B24D 18/00* (2013.01); *B29C 67/007* (2013.01); *B29C 67/0062* (2013.01); *B33Y 80/00* (2014.12); *B29C 67/0059* (2013.01); *B29C 67/0081* (2013.01); *B29K 2075/00* (2013.01); *B29K 2509/02* (2013.01); *B33Y 30/00* (2014.12); *B33Y 50/02* (2014.12)

(58) Field of Classification Search
None
See application file for complete search history.

(56) References Cited

U.S. PATENT DOCUMENTS

| | | | |
|---|---|---|---|
| 5,257,478 A | | 11/1993 | Hyde et al. |
| 5,387,380 A | * | 2/1995 | Cima ............... B05C 19/04 264/109 |

(Continued)

FOREIGN PATENT DOCUMENTS

| | | |
|---|---|---|
| DE | 19834559 | 2/2000 |
| EP | 1512519 | 3/2005 |

(Continued)

OTHER PUBLICATIONS

International Search Report and Written Opinion in International Application No. PCT/US2013/035513, mailed Jun. 25, 2013, 12 pages.

(Continued)

*Primary Examiner* — Mary F Theisen
(74) *Attorney, Agent, or Firm* — Fish & Richardson P.C.

(57) ABSTRACT

A method of fabricating a polishing layer of a polishing pad includes successively depositing a plurality of layers with a 3D printer, each layer of the plurality of polishing layers deposited by ejecting a pad material precursor from a nozzle and solidifying the pad material precursor to form a solidified pad material.

16 Claims, 2 Drawing Sheets

(56) References Cited

U.S. PATENT DOCUMENTS

| | | | |
|---|---|---|---|
| 5,738,574 | A | 4/1998 | Tolles et al. |
| 5,900,164 | A | 5/1999 | Budinger et al. |
| 5,906,863 | A | 5/1999 | Lombardi et al. |
| 5,921,855 | A | 7/1999 | Osterheld et al. |
| 5,932,290 | A | 8/1999 | Lombardi et al. |
| 5,940,674 | A | 8/1999 | Sachs et al. |
| 6,423,255 | B1 | 7/2002 | Hoechsmann et al. |
| 6,875,097 | B2 | 4/2005 | Grunwald |
| 7,531,117 | B2 | 5/2009 | Ederer et al. |
| 2001/0020448 | A1 | 9/2001 | Vaartstra et al. |
| 2002/0111707 | A1* | 8/2002 | Li ............... B29C 67/0059 700/118 |
| 2004/0154533 | A1 | 8/2004 | Agarwal et al. |
| 2005/0012247 | A1* | 1/2005 | Kramer ............ B29C 67/0059 264/401 |
| 2005/0049739 | A1* | 3/2005 | Kramer ............ B29C 67/0081 700/119 |
| 2005/0110853 | A1 | 5/2005 | Gardner et al. |
| 2005/0278056 | A1* | 12/2005 | Farnworth ....... B29C 67/0059 700/118 |
| 2006/0019587 | A1* | 1/2006 | Deopura ............. B24B 37/26 451/526 |
| 2006/0099287 | A1* | 5/2006 | Kim .................. B29C 67/0081 425/174.4 |
| 2006/0111807 | A1* | 5/2006 | Gothait ............. B29C 67/0088 700/119 |
| 2006/0192315 | A1 | 8/2006 | Farr et al. |
| 2007/0128991 | A1* | 6/2007 | Yoon ................. B24B 37/245 451/56 |
| 2007/0212979 | A1 | 9/2007 | Preston |
| 2007/0235904 | A1 | 10/2007 | Saikin |
| 2008/0157436 | A1 | 7/2008 | Patel et al. |
| 2009/0321979 | A1 | 12/2009 | Hiraide |
| 2010/0191360 | A1* | 7/2010 | Napadensky ...... B29C 67/0059 700/98 |
| 2010/0323050 | A1 | 12/2010 | Kumagai et al. |
| 2011/0059247 | A1 | 3/2011 | Kuzusako et al. |
| 2013/0283700 | A1 | 10/2013 | Bajaj et al. |

FOREIGN PATENT DOCUMENTS

| | | |
|---|---|---|
| EP | 1661690 | 5/2006 |
| EP | 2277686 | 1/2011 |
| EP | 2431157 | 3/2012 |
| KR | 10-2005-0052876 | 6/2005 |
| KR | 10-2008-0038607 | 5/2008 |
| TW | 201234466 | 8/2012 |
| WO | WO 01/64396 | 9/2001 |
| WO | WO 02/24415 | 3/2002 |
| WO | WO 2013/128452 | 9/2013 |

OTHER PUBLICATIONS

'Wikipedia' [online]. "3D priting," 2013, [retrieved on Feb. 25, 2013]. Retrieved from the Internet: URL:http://en.wikipedia.org/wiki/3D_printing 17 pages.

Cook, "CMP Consumables II: Pad," Semiconductors and Semimetals (2000), p. 155-181.

Jun et al., "Slicing Bitmap Generation and Patterning technique a SFF System Using UV-resin," International Conference on Control, Automation and Systems (2007).

Krober et al., "Reactive inkjet printing of polyurethanes," Journal of Materials Chemistry 19:5234-5238 (2009).

Rodel, Rodel IC1000 CMP Pad (1999).

Van den Berg et al., "Inkjet printing of polyurethane colloidal suspensions," Soft Matter 3:238-243 (2007).

Yang et al., "High Viscosity Jetting System for 3D Reactive Inkjet Printing," Twenty Forth Annual International Solid Freeform Fabrication Symposium (2013), pp. 505-513.

Desai et al., "Effect of Polishing Pad Material Properties on Chemical Mechanical Polishing (CMP) Processes," Center for Polymer Research, University of Texas (1994), 637-644.

European Search Report in European Application No. 13782401.7, dated Mar. 24, 2016, 10 pages.

Taiwan Office Action in Taiwan Application No. 102112533, dated Jun. 28, 2016, 10 pages (English Summary).

Chinese Office Action in Chinese Application No. 201380023299.6, dated Jul. 1, 2016, 11 pages (English Translation).

* cited by examiner

APPARATUS FOR PRINTING A CHEMICAL MECHANICAL POLISHING PAD

CROSS-REFERENCE TO RELATED APPLICATIONS

This application is a continuation of U.S. application Ser. No. 13/591,051, filed Aug. 21, 2012, which claims priority to U.S. Provisional Application No. 61/638,461, filed on Apr. 25, 2012, the entire disclosures of which are incorporated by reference.

TECHNICAL FIELD

This present invention relates to polishing pads used in during chemical mechanical polishing.

BACKGROUND

An integrated circuit is typically formed on a substrate by the sequential deposition of conductive, semiconductive, or insulative layers on a silicon wafer. A variety of fabrication processes require planarization of a layer on the substrate. For example, for certain applications, e.g., polishing of a metal layer to form vias, plugs, and lines in the trenches of a patterned layer, an overlying layer is planarized until the top surface of a patterned layer is exposed. In other applications, e.g., planarization of a dielectric layer for photolithography, an overlying layer is polished until a desired thickness remains over the underlying layer.

Chemical mechanical polishing (CMP) is one accepted method of planarization. This planarization method typically requires that the substrate be mounted on a carrier head. The exposed surface of the substrate is typically placed against a rotating polishing pad. The carrier head provides a controllable load on the substrate to push it against the polishing pad. A polishing liquid, such as slurry with abrasive particles, is typically supplied to the surface of the polishing pad.

One objective of a chemical mechanical polishing process is polishing uniformity. If different areas on the substrate are polished at different rates, then it is possible for some areas of the substrate to have too much material removed ("overpolishing") or too little material removed ("underpolishing").

Conventional polishing pads include "standard" pads and fixed-abrasive pads. A standard pad has a polyurethane polishing layer with a durable roughened surface, and can also include a compressible backing layer. In contrast, a fixed-abrasive pad has abrasive particles held in a containment media, and can be supported on a generally incompressible backing layer.

Polishing pads are typically made by molding, casting or sintering polyurethane materials. In the case molding, the polishing pads can be made one at a time, e.g., by injection molding. In the case of casting, the liquid precursor is cast and cured into a cake, which is subsequently sliced into individual pad pieces. These pad pieces can then be machined to a final thickness. Grooves can be machined into the polishing surface, or be formed as part of the injection molding process.

In addition to planarization, polishing pads can be used for finishing operations such as buffing.

SUMMARY

In order to provide polishing uniformity, the polishing pad needs to form a uniform contact with the substrate being polished, such that uniform pressure can be applied across the substrate surface. A variation in thickness of the pads can create non-uniform pressure across the substrate surface. Even small variations in thickness lead to variations in the applied pressure, and hence non-uniform removal as well as higher defects such as micro-scratches on the substrate surface. This effect is more acute for hard polishing pads, and is also more acute at low pressure polish processes. Although a soft polishing pad can accommodate larger thickness variations, the process of forming grooving in the pad is more likely to generate non-uniformity for the soft polishing pad.

A technique for manufacturing polishing pads that can provide improved thickness uniformity is to use a 3D printing process. In a 3D printing process a thin layer of pad precursor, e.g., a powder, is progressively deposited and fused to form a full 3-dimensional polishing pad.

In one aspect a method of fabricating a polishing layer of a polishing pad includes successively depositing a plurality of layers with a 3D printer, each layer of the plurality of polishing layers deposited by ejecting a pad material precursor from a nozzle and solidifying the pad material precursor to form a solidified pad material.

Implementations of the invention may include one or more of the following features. A thickness of each layer of the plurality of layers may be less than 50% of a total thickness of the polishing layer. A thickness of each layer of the plurality of layers may be less than 1% of a total thickness of the polishing layer. Recesses may be formed in the polishing layer by controlling ejection of the pad material precursor with 3D drawing program run on a computer to form a pattern in at least some of the plurality of layers. The recesses may be 10%-75% of the total horizontal surface area of the polishing pad. Plateaus between the recesses may have lateral dimension of 0.1 to 2.5 mm. The recesses may have a depth of 0.25 to 1.5 mm. The recesses may have a widest lateral dimension of 0.1 mm to 2 mm. The recesses may be shaped as one or more of a cylindrical, a truncated pyramid or a prism. The recesses may be grooves. Solidifying the pad material precursor may include curing the pad material precursor. Curing the pad material precursor may include ultraviolet (UV) curing. The pad material precursor may include a urethane monomer. The solidified pad material may include polyurethane. Abrasive particles may be supplied in the solidified pad material. The abrasive particles may be metal oxide particles. A backing layer of the polishing pad may be formed by successively depositing a plurality of layers with the 3D printer. Forming the backing layer may include curing the plurality of layers of the backing layer by a different amount than the plurality of layers of the polishing layer. Forming the backing layer may include ejecting a different material than the pad precursor material. The solidified polishing material may have a hardness between about 40 to 80 Shore D. The pad material precursor may be a melted pad material and solidifying the pad material precursor may include cooling the melted pad material.

Potential advantages of the invention may include one or more of the following. A polishing pad can be manufactured with very tight tolerance, i.e., good thickness uniformity. Grooves can be formed in the polishing pad without distorting the thickness uniformity. Polishing uniformity across the substrate may be improved, particularly at low pressures such as below 0.8 psi, or even below 0.5 psi or 0.3 psi. The pad manufacturing process is adaptable to different polishing pad configuration and groove patterns. A polishing pad can be manufactured faster and cheaper.

The details of one or more implementations are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1A:
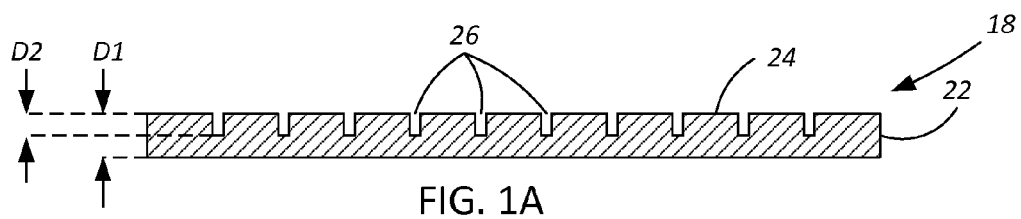
FIG. 1A is a schematic cross-sectional side view of an example polishing pad.
Figure 1B:
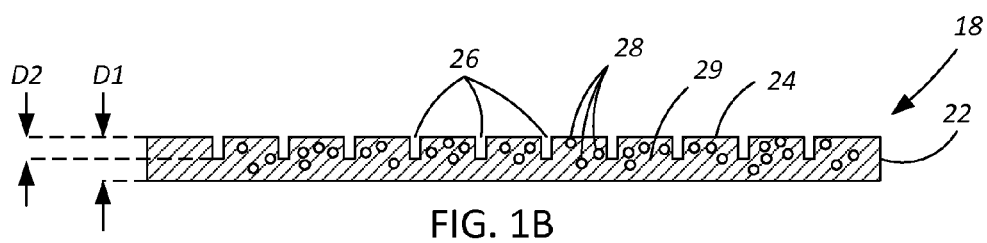
FIG. 1B is a schematic cross-sectional side view of another example polishing pad.
Figure 1C:
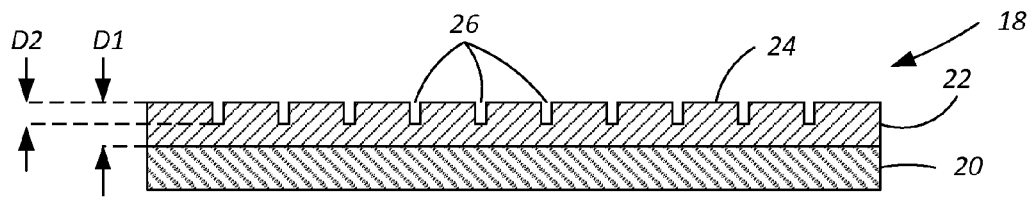
FIG. 1C is a schematic cross-sectional side view of yet another example polishing pad.

Referring to FIG. 1A-1C, a polishing pad 18 includes a polishing layer 22. As shown in FIG. 1A the polishing pad can be a single-layer pad that consists of the polishing layer 22, or as shown in FIG. 1C the polishing pad can be a multi-layer pad that includes the polishing layer 22 and at least one backing layer 20.

The polishing layer 22 can be a material that is inert in the polishing process. The material of the polishing layer 22 can be a plastic, e.g., a polyurethane. In some implementations the polishing layer 22 is a relative durable and hard material. For example, the polishing layer 22 can have a hardness of about 40 to 80, e.g., 50 to 65, on the Shore D scale.

As shown in FIG. 1A, the polishing layer 22 can be a layer of homogeneous composition, or as shown in FIG. 1B the polishing layer 22 can include abrasive particles 28 held in a matrix 29 of plastic material, e.g., polyurethane. The abrasive particles 28 are harder than the material of the matrix 29. The abrasive particles 28 can be from 0.05 wt % to 75 wt % of the polishing layer. For example, the abrasive particles 28 can be less than 1 wt % of the polishing layer 22, e.g., less than 0.1 wt %. Alternatively, the abrasive particles 28 can be greater than 10 wt % of the polishing layer 22, e.g., greater than 50 wt %. The material of the abrasive particles can be a metal oxide, such as ceria, alumina, silica or a combination thereof.

In some implementations, the polishing layer includes pores, e.g., small voids. The pores can be 50-100 microns wide.

The polishing layer 22 can have a thickness D1 of 80 mils or less, e.g., 50 mils or less, e.g., 25 mils or less. Because the conditioning process tends to wear away the cover layer, the thickness of the polishing layer 22 can be selected to provide the polishing pad 18 with a useful lifetime, e.g., 3000 polishing and conditioning cycles.

On a microscopic scale, the polishing surface 24 of the polishing layer 22 can have rough surface texture, e.g., 2-4 microns rms. For example, the polishing layer 22 can be subject to a grinding or conditioning process to generate the rough surface texture. In addition, 3D printing can provide small uniform features, e.g., down to 200 microns.

Although the polishing surface 24 can be rough on a microscopic scale, the polishing layer 22 can have good thickness uniformity on the macroscopic scale of the polishing pad itself (this uniformity refer to the global variation in height of the polishing surface 24 relative to the bottom surface of the polishing layer, and does not count any macroscopic grooves or perforations deliberately formed in the polishing layer). For example, the thickness non-uniformity can be less than 1 mil.

Optionally, at least a portion of the polishing surface 24 can include a plurality of grooves 26 formed therein for carrying slurry. The grooves 26 may be of nearly any pattern, such as concentric circles, straight lines, a cross-hatched, spirals, and the like. Assuming grooves are present, then the polishing surface 24, i.e., the plateaus between the grooves 26, can be 25-90% of the total horizontal surface area of the polishing pad 18. Thus, the grooves 26 can occupy 10%-75% of the total horizontal surface area of the polishing pad 18. The plateaus between the grooves 26 can have a lateral width of about 0.1 to 2.5 mm.

In some implementations, e.g., if there is a backing layer 20, the grooves 26 can extend entirely through the polishing layer 22. In some implementations, the grooves 26 can extend through about 20-80%, e.g., 40%, of the thickness of the polishing layer 22. The depth of the grooves 26 can be 0.25 to 1 mm. For example, in a polishing pad 18 having a polishing layer 22 that is 50 mils thick, the grooves 26 can have a depth D2 of about 20 mils.

The backing layer 20 can be softer and more compressible than the polishing layer 22. The backing layer 20 can have a hardness of 80 or less on the Shore A scale, e.g., a hardness of about 60 Shore A. The backing layer 20 can be thicker or thinner or the same thickness as the polishing layer 22.

For example, the backing layer can be an open-cell or a closed-cell foam, such as polyurethane or polysilicone with voids, so that under pressure the cells collapse and the backing layer compresses. A suitable material for the backing layer is PORON 4701-30 from Rogers Corporation, in Rogers, Conn., or SUBA-IV from Rohm & Haas. The hardness of the backing layer can be adjusted by selection of the layer material and porosity. Alternatively, the backing layer 20 can be formed from the same precursor and have the same porosity as the polishing layer, but have a different degree of curing so as to have a different hardness.

Figure 2:
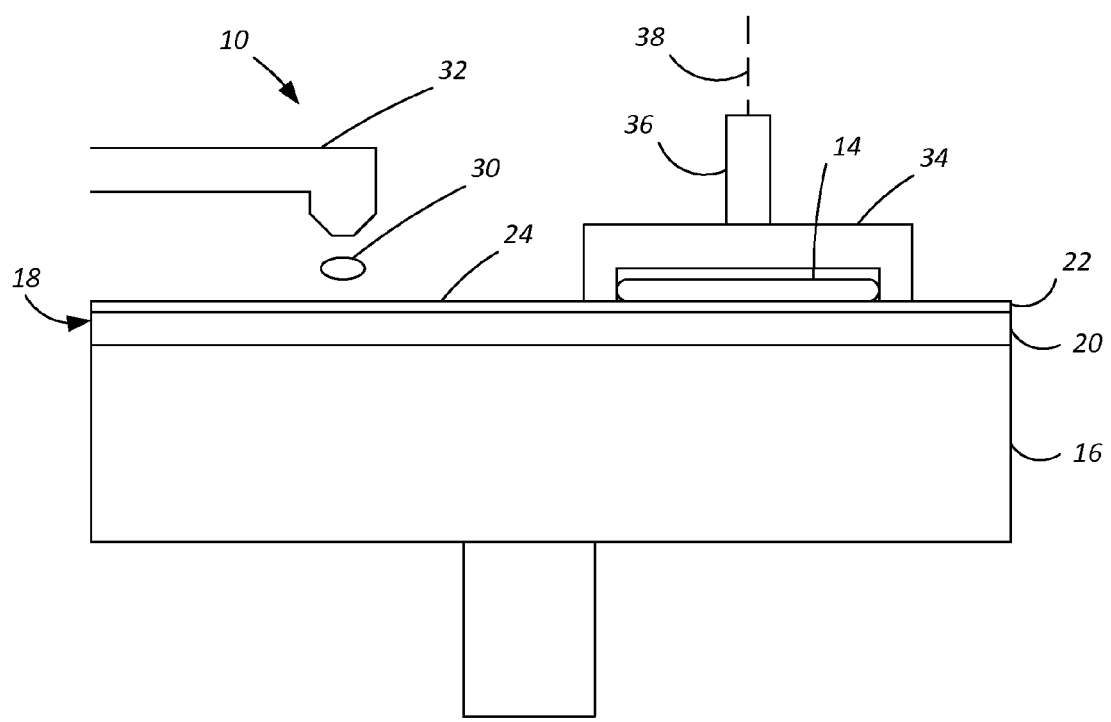
FIG. 2 is a schematic side view, partially cross-sectional, of a chemical mechanical polishing station.

Turning now to FIG. 2, one or more substrates 14 can be polished at a polishing station 10 of a CMP apparatus. A description of a suitable polishing apparatus can be found in U.S. Pat. No. 5,738,574, the entire disclosure of which is incorporated herein by reference.

The polishing station 10 can include a rotatable platen 16 on which is placed the polishing pad 18. During a polishing step, a polishing liquid 30, e.g., abrasive slurry, can be supplied to the surface of polishing pad 18 by a slurry supply port or combined slurry/rinse arm 32. The polishing liquid 30 can contain abrasive particles, a pH adjuster, or chemically active components.

The substrate 14 is held against the polishing pad 18 by a carrier head 34. The carrier head 34 is suspended from a support structure, such as a carousel, and is connected by a carrier drive shaft 36 to a carrier head rotation motor so that the carrier head can rotate about an axis 38. The relative motion of the polishing pad 18 and the substrate 14 in the presence of the polishing liquid 30 results in polishing of the substrate 14.

Figure 3:
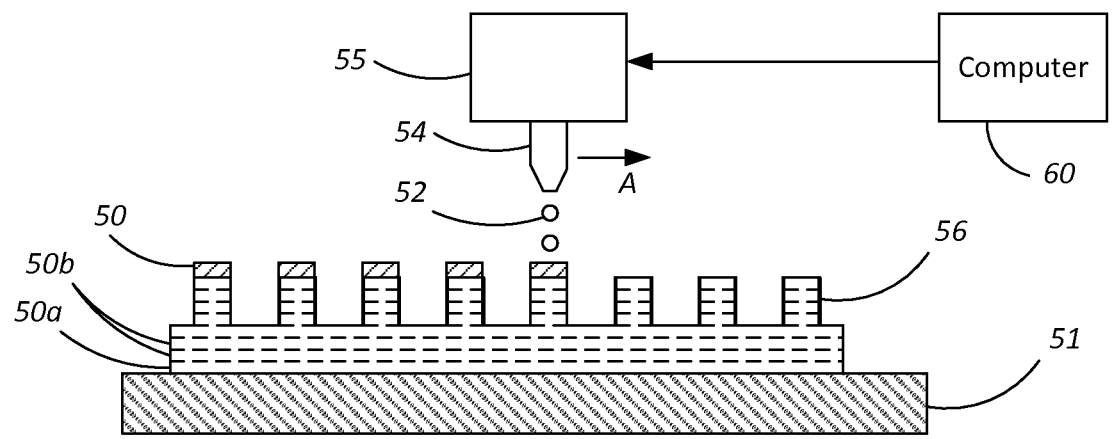
FIG. 3 is a schematic cross-sectional side view illustrating a substrate in contact with the polishing pad of FIG. 1A.

Referring to FIG. 3, at least the polishing layer 22 of the polishing pad 18 is manufactured using a 3D printing process. In the manufacturing process, thin layers of material are progressively deposited and fused. For example, droplets 52 of pad precursor material can be ejected from a nozzle 54 of a droplet ejecting printer 55 to form a layer 50. The droplet ejecting printer is similar to an inkjet printer, but uses the pad precursor material rather than ink. The nozzle 54 translates (shown by arrow A) across a support 51.

For a first layer 50a deposited, the nozzle 54 can eject onto the support 51. For subsequently deposited layers 50b, the nozzle 54 can eject onto the already solidified material 56. After each layer 50 is solidified, a new layer is then deposited over the previously deposited layer until the full 3-dimensional polishing layer 22 is fabricated. Each layer is applied by the nozzle 54 in a pattern stored in a 3D drawing computer program that runs on a computer 60. Each layer 50 is less than 50% of the total thickness of the polishing layer 22, e.g., less than 10%, e.g., less than 5%, e.g., less than 1%.

The support 51 can be a rigid base, or be a flexible film, e.g., a layer of polytetrafluoroethylene (PTFE). If the support 51 is a film, then the support 51 can form a portion of the polishing pad 18. For example, the support 51 can be the backing layer 20 or a layer between the backing layer 20 and the polishing layer 22. Alternatively, the polishing layer 22 can be removed from the support 51.

Solidification can be accomplished by polymerization. For example, the layer 50 of pad precursor material can be a monomer, and the monomer can be polymerized in-situ by ultraviolet (UV) curing. The pad precursor material can be cured effectively immediately upon deposition, or an entire layer 50 of pad precursor material can be deposited and then the entire layer 50 be cured simultaneously.

However, there are alternative technologies to accomplish 3D printing. For example, the droplets 52 can be a polymer melt that solidifies upon cooling. Alternatively, the printer creates the polishing layer 22 by spreading a layer of powder and ejecting droplets of a binder material onto the layer of powder. In this case, the powder could include additives, e.g., the abrasive particles 28.

The 3D printing approach eliminates the need for making expensive and time consuming molds. The 3D printing approach also eliminates several conventional pad manufacturing steps such as molding, casting and machining Additionally, tight tolerances can be achieved due to the layer-by-layer printing approach. Also, one printing system (with printer 55 and computer 60) can be used to manufacture a variety of different polishing pads, simply by changing the pattern stored in the 3D drawing computer program.

In some implementations, the backing layer 20 can also be fabricated by a 3D printing process. For example, the backing layer 20 and polishing layer 22 could be fabricated in an uninterrupted operation by the printer 55. The backing layer 20 can be provided with a different hardness than the polishing layer 22 by using a different amount of curing, e.g., a different intensity of UV radiation.

In other implementations, the backing layer 20 is fabricated by a conventional process and then secured to the polishing layer 22. For example, the polishing layer 22 can be secured to the backing layer 20 by a thin adhesive layer, e.g., as a pressure-sensitive adhesive.

A number of implementations have been described. Nevertheless, it will be understood that various modifications may be made. For example, either the polishing pad, or the carrier head, or both can move to provide relative motion between the polishing surface and the substrate. The polishing pad can be a circular or some other shape. An adhesive layer can be applied to the bottom surface of the polishing pad to secure the pad to the platen, and the adhesive layer can be covered by a removable liner before the polishing pad is placed on the platen. In addition, although terms of vertical positioning are used, it should be understood that the polishing surface and substrate could be held upside down, in a vertical orientation, or in some other orientation.

Accordingly, other implementations are within the scope of the following claims.

What is claimed is:

1. An apparatus for fabricating a polishing layer of a polishing pad, comprising:
    a supply of liquid polishing pad material precursor that becomes a polishing pad material upon curing;
    a 3D printer including a nozzle and configured to successively deposit a plurality of layers to form the polishing layer on a support by ejecting droplets of the pad material precursor without a powder;
    a computer coupled to the 3D printer and configured to control the 3D printer to deposit a first layer of the plurality of layers by ejecting droplets of the pad material precursor from the nozzle onto the support and to deposit each subsequent layer of the plurality layers by ejecting droplets of the pad material precursor from the nozzle directly onto an underlying layer of solidified polishing pad material without a layer of powder; and
    a UV radiation source to cure the pad material precursor to solidify the liquid polishing pad material precursor so as to form the polishing pad material.

2. The apparatus of claim 1, wherein the computer is configured to control the 3D printer such that a thickness of each layer of the plurality of layers is less than 50% of a total thickness of the polishing layer.

3. The apparatus of claim 2, wherein the thickness of each layer of the plurality of layers is less than 1% of the total thickness of the polishing layer.

4. The apparatus of claim 1, wherein the computer includes a 3D drawing program configured to control the 3D printer to form a pattern in at least some of the plurality of layers to form recesses in the polishing layer by controlling ejection of the pad material precursor.

5. The apparatus of claim 1, wherein the nozzle is configured to translate across the support.

6. The apparatus of claim 1, wherein the pad material precursor comprises a monomer.

7. The apparatus of claim 1, wherein the support is a structure of the apparatus.

8. The apparatus of claim 1, wherein the 3D printer is configured to eject droplets onto a support that forms a portion of the polishing pad.

9. The apparatus of claim 1, wherein the UV radiation source is configured to cure the pad material precursor immediately upon deposition.

10. The apparatus of claim 1, wherein the UV radiation source is configured to cure an entire layer of pad material precursor simultaneously after deposition of the layer.

11. The apparatus of claim 6, wherein the pad material precursor comprises a urethane monomer.

12. An apparatus for fabricating a polishing pad, comprising:
    a support to hold a plurality of layers of the polishing pad;
    a 3D printer including a nozzle and configured to successively deposit the plurality of layers over the support to form the polishing pad by ejecting droplets of a pad material precursor;
    a computer coupled to the 3D printer and configured to control the 3D printer to cause the 3D printer to form a backing layer of the polishing pad by successively depositing a first plurality of layers by ejecting droplets of a backing layer precursor from the nozzle and to form a polishing layer of the polishing pad by successively depositing a second plurality of layers with the 3D printer over the first plurality of layers by ejecting droplets of a polishing layer precursor from the nozzle, the wherein the backing layer precursor is a same precursor as the polishing layer precursor; and means for curing configured to cure the backing layer precursor by a different degree than the polishing layer precursor such that the backing layer is softer than the polishing layer.

13. The apparatus of claim 12, wherein the means for curing is configured to cure the polishing layer precursor such that solidified polishing material has a hardness between about 40 to 80 Shore D.

14. The apparatus of claim 12, comprising a supply of the backing layer precursor, wherein the backing layer precursor comprises a urethane monomer.

15. The apparatus of claim 12, wherein the means for curing comprises a UV radiation source.

16. The apparatus of claim 15, wherein the means for curing is configured to cure the backing layer precursor by a different degree than the polishing layer precursor by using a different intensity of UV radiation.

* * * * *

UNITED STATES PATENT AND TRADEMARK OFFICE
CERTIFICATE OF CORRECTION

| | | |
|---|---|---|
| PATENT NO. | : 9,457,520 B2 | |
| APPLICATION NO. | : 14/737356 | |
| DATED | : October 4, 2016 | |
| INVENTOR(S) | : Rajeev Bajaj, Barry Lee Chin and Terrance Y. Lee | |

It is certified that error appears in the above-identified patent and that said Letters Patent is hereby corrected as shown below:

In the Claims

In Claim 12, Column 7, Line 5, before "wherein" delete "the".

Signed and Sealed this
Twenty-seventh Day of December, 2016

Michelle K. Lee
*Director of the United States Patent and Trademark Office*